US011737394B2

United States Patent
Popp et al.

(10) Patent No.: US 11,737,394 B2
(45) Date of Patent: Aug. 29, 2023

(54) CROP FLOW NOZZLE

(71) Applicant: Deere & Company, Moline, IL (US)

(72) Inventors: Candace Popp, Dixon, IA (US); Douglas G. Temple, Fulton, IL (US); Nithin Chaithanya Reddy Choudary, Bettendorf, IA (US); Wolfram Haiges, Magstadt (DE)

(73) Assignee: Deere & Company, Moline, IL (US)

( * ) Notice: Subject to any disclaimer, the term of this patent is extended or adjusted under 35 U.S.C. 154(b) by 379 days.

(21) Appl. No.: 16/949,469

(22) Filed: Oct. 30, 2020

(65) Prior Publication Data

US 2021/0368688 A1 Dec. 2, 2021

Related U.S. Application Data

(60) Provisional application No. 63/031,960, filed on May 29, 2020.

(51) Int. Cl.
*A01F 12/46* (2006.01)
*A01D 41/127* (2006.01)
(Continued)

(52) U.S. Cl.
CPC .......... *A01F 12/46* (2013.01); *A01D 41/1277* (2013.01); *A01D 90/10* (2013.01); *G01N 21/85* (2013.01)

(58) Field of Classification Search
CPC ..... A01F 12/46; A01D 41/1277; A01D 90/10; A01D 41/1217; A01D 41/1271; G01N 21/85
See application file for complete search history.

(56) References Cited

U.S. PATENT DOCUMENTS 2,783,498 A * 3/1957 Bruc ................ B30B 11/243
198/677
3,760,267 A * 9/1973 Williams ............. G01N 27/223
324/670
(Continued)

FOREIGN PATENT DOCUMENTS

CA 2182989 C * 3/2001 ......... A01D 41/1277
EP 0938838 A1 * 9/1999 ......... A01D 41/1277
(Continued)

OTHER PUBLICATIONS

Laurie Bedord, New Version of CropScan 3000H on Combine Analyzer Released, pp. 1-7 [online], [retrieved on Mar. 30, 2021]. Retrieved from the Internet <URL: https://www.agriculture.com/news/technology/new-version-of-cropscan-3000h-on-combine-analyzer-released>.
(Continued)

*Primary Examiner* — Arpad F Kovacs

(57) ABSTRACT

Selectively removable nozzles for inclusion into a grain conveyor may include a ramp and a sidewall coupled to the ramp. The ramp may conform to an inner surface of a conveyor housing and produce a constriction within the housing. The sidewall may also conform to the inner surface of the conveyor housing. The ramp may also include a recess that extends along the sidewall. The recess may receive a shaft of the conveyor. One nozzle may be replaced with another in order to accommodate different harvesting conditions. The ramp compresses grain traveling through the conveyor to provide a continuous flow of grain. The continuous flow of grain provides for accurate measurements of grain characteristics by a sensor located adjacent to the flow of grain.

19 Claims, 4 Drawing Sheets

(51) Int. Cl.
*A01D 90/10* (2006.01)
*G01N 21/85* (2006.01)

(56) References Cited

U.S. PATENT DOCUMENTS

| | | | | |
|---|---|---|---|---|
| 4,093,087 | A * | 6/1978 | DeCoene | A01D 41/1217 |
| | | | | 414/526 |
| 5,092,819 | A | 3/1992 | Schroeder et al. | |
| 5,716,272 | A * | 2/1998 | Nelson | G01N 22/04 |
| | | | | 460/149 |
| 6,083,103 | A | 7/2000 | Posselius et al. | |
| 6,125,620 | A | 10/2000 | Posselius et al. | |
| 6,208,255 | B1 * | 3/2001 | Conrad | A01C 7/105 |
| | | | | 340/684 |
| 6,346,888 | B1 * | 2/2002 | Conrad | A01C 7/105 |
| | | | | 340/684 |
| 6,686,749 | B2 * | 2/2004 | Rains | A01D 41/1208 |
| | | | | 324/689 |
| 7,861,606 | B2 * | 1/2011 | Kormann | A01D 41/127 |
| | | | | 73/863.52 |
| 10,945,367 | B2 * | 3/2021 | Inoue | A01D 41/1208 |
| 11,054,369 | B2 * | 7/2021 | Mannhardt | A01D 41/1277 |
| 11,371,930 | B2 * | 6/2022 | Schade | G01N 21/85 |
| 2006/0002774 | A1 * | 1/2006 | Stumborg | B65G 53/08 |
| | | | | 406/57 |
| 2009/0286582 | A1 | 11/2009 | Kormann | |
| 2011/0151952 | A1 | 6/2011 | Kormann et al. | |
| 2013/0087432 | A1 * | 4/2013 | Priepke | B65G 19/14 |
| | | | | 198/716 |
| 2015/0027854 | A1 * | 1/2015 | Priepke | A01D 41/1217 |
| | | | | 198/823 |
| 2015/0132093 | A1 * | 5/2015 | Biggerstaff | A01D 43/087 |
| | | | | 414/523 |
| 2019/0335665 | A1 * | 11/2019 | Veikle | A01D 41/1217 |
| 2019/0335666 | A1 * | 11/2019 | Veikle | A01D 41/1217 |

FOREIGN PATENT DOCUMENTS

| | | | | |
|---|---|---|---|---|
| EP | 00958728 | A1 | 11/1999 | |
| JP | 2017046641 | A * | 3/2017 | A01D 41/1208 |
| KR | 101780662 | B1 * | 9/2017 | A01F 12/46 |
| WO | WO-2019003831 | A1 * | 1/2019 | A01D 69/06 |
| WO | WO-2021250041 | A1 * | 12/2021 | B02B 5/00 |

OTHER PUBLICATIONS

John Deere introduces new HarvestLab™ 3000 with constituent sensing, dated Oct. 5, 2017, pp. 1-2 [online], [retrieved on Mar. 30, 2021]. Retrieved from the Internet <URL: https://hoards.com/print-article-21864-permanent.html>.

Screen captures from YouTube video clip entitled "CropScan 3000H On Combine NIR Grain Analyser," 5 pages, uploaded on Aug. 17, 2017 by user "Next Instruments". Retrieved from Internet: <https://www.youtube.com/watch?v=TMPTndQ1pUw&feature=youtu.be>.

* cited by examiner

CROP FLOW NOZZLE

CROSS-REFERENCE TO RELATED APPLICATIONS

This application claims the benefit of U.S. Provisional Application No. 63/031,960, filed May 29, 2020, the entire contents of which are incorporated herein by reference.

FIELD OF THE DISCLOSURE

The present disclosure relates generally to arranging grain in the course of sensing the grain.

BACKGROUND OF THE DISCLOSURE

During harvesting, produced grain may be sensed to detect various characteristics of the produced grain. For example, during harvesting, the produced grain may be sensed to determine constituent characteristics such as moisture, dry matter, protein, starch, neutral detergent fiber (NDF), or acid detergent fiber (ADF). Sensor results are provided in real-time and allow producers to take more frequent and representative samples rather than relying on periodic, non-representative samples measured, for example, via wet-chemistry analysis. Producers can view constituent measurements while harvesting and then quickly make on-the-go adjustments to maximize feed quality.

SUMMARY OF THE DISCLOSURE

A first aspect of the present disclosure is directed to a nozzle receivable into an interior cavity of a conveyor to alter a cross-sectional size of the interior cavity of the conveyor. The nozzle may include a ramp comprising a first edge configured to conform to an interior surface of a conveyor; a sidewall coupled to the ramp, the sidewall comprising side edges configured to conform to the interior surface of the conveyor; an angle θ defined between the ramp and the sidewall; and a recess formed in the sidewall and extending longitudinally therein, the recess configured to receive a shaft of the conveyor.

A second aspect of the present disclosure is directed to a conveyor for transport of grain. The conveyor may include a housing defining a cavity with a cross-sectional size. The housing may include an inner surface and a longitudinal axis extending along the cavity. The conveyor may also include a flighting disposed in the cavity and rotatable therein. The flighting may include a shaft, a first portion attached to the shaft, and a second portion attached to the shaft. The second portion may be separated from the first portion by a gap. The conveyor may also include a nozzle disposed in the cavity and affixed to the housing. The nozzle may extend at least partially along the gap and may include a ramp, a sidewall extending along the cavity, and an angle θ defined between the ramp and the sidewall, the nozzle defining a restriction that reduces the cross-sectional size of the cavity.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
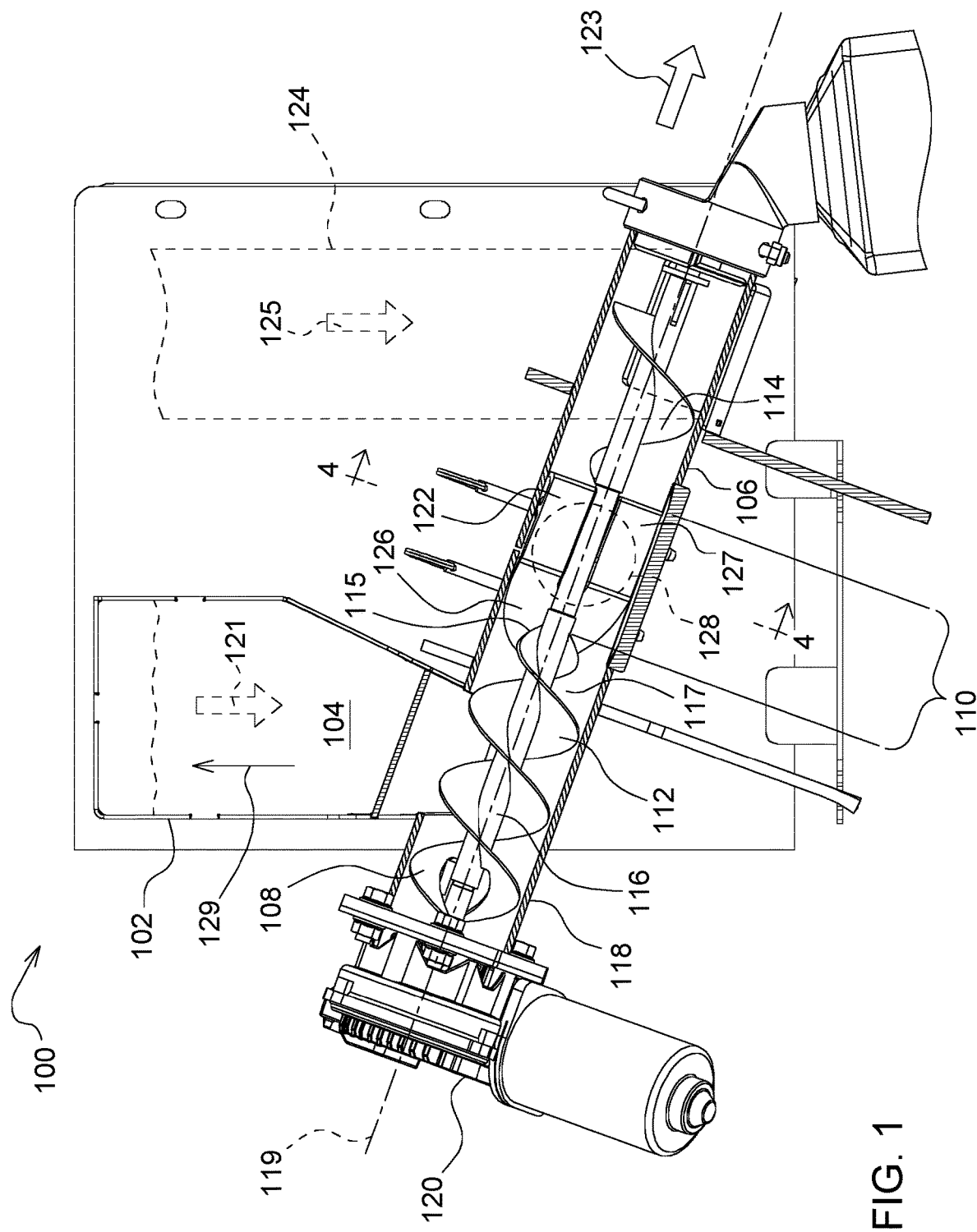
FIG. 1 is a partial cross-sectional view of a portion of a conveyor system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to grain sensing and, particularly, to forming a flow path to generate a flow stream of grain that is sensed to provide characteristics of the grain. FIG. 1 is a partial cross-sectional view of a portion of a conveyor system 100. In the illustrated example, the conveyor system 100 forms part of a combine harvester used to harvest grain. In other implementations, the conveyor system 100 may be unassociated and separate from a combine harvester or other vehicle. For example, in some instances, the conveyor system 100 may form part of a larger grain conveying system.

The conveyor system 100 includes a first conveyor 102 through which produced grain 104 is conveyed during harvesting. The first conveyor 102 may include a flighted belt or other apparatus that is used to lift the produced grain 104. The first conveyor 102 is in communication with a second conveyor 106, and the produced grain 104 is released from the first conveyor 102 into the second conveyor 106. The second conveyor 106 is an auger that includes a rotatable, helical flighting 108 that includes a gap 110 formed between a first portion 112 of the flighting 108 and a second portion 114 of the flighting 108. The flighting 108 includes a shaft 116. The flighting 108 is disposed in a housing 118 and is rotatable therein by a motive apparatus 120, such as an electric motor. The second conveyor 106 defines a longitudinal axis 119 that extends along a centerline of the shaft 116 of the flighting 108.

A removable nozzle 122 is disposed in a cavity 117 formed by the housing 118 and extends along the gap 110 formed between the first and second portions 112 and 114 of the flighting 108. As shown in FIG. 1, an end 115 of the first portion 112 of the flighting 180 is tapered. The tapered end 115 provides clearance for a ramp of the nozzle 122, described in more detail below. The nozzle 122 maintains a fixed position within the housing 118, even when the flighting 108 is being rotated by the motive apparatus 120. The nozzle 122 may be maintained at a fixed position within the housing 118 by one or more pins that extend through the housing 118 and the nozzle 122. In other implementations, the nozzle 122 may engage an annular flange or lip formed on or coupled to the housing 118. The lip may be keyed to define an orientation of the nozzle 122 within the housing 118, thereby preventing rotation and translation of the nozzle 122 within the housing 118. In still other implementations, the nozzle 122 may be removably affixed within the housing 118 in other ways.

A third conveyor 124 is in communication with the second conveyor 106, and the produced grain is released from the second conveyor 106 into the third conveyor 124. The third conveyor 124 may include a flighted belt and may transport the produced grain 104, such as by lifting, into a holding tank formed in the combine harvester. Arrows 121, 123, and 125 represent the flow of the produced grain 104 through the example conveyor system 100 along the first, second, and third conveyors 102, 106, and 124, respectively. Arrow 129 indicates that the first conveyor 106 lifts the produced grain 104. After being lifted, the produced grain falls in the direction of arrow 121 into the second conveyor 106. The produced grain 104 travels in the direction of arrow 123 along the second conveyor 106 and is deposited in the third conveyor 124. The third conveyor 124 lowers the produced grain 104 in the direction of arrow 125. The flow of the produced grain 104 provided by the conveyor system 100 is merely one example. In other implementations, a conveyor system may have additional or fewer conveyors, and directions of transport of the produced grain within one or more conveyors may be different than those described in the illustrated example.

Returning to the second conveyor 106, as the flighting 108 rotates, the produced grain is transported along the second conveyor 106. As the produced grain 104 reaches the gap 110, the produced grain 104 encounters a ramp 126 of the nozzle 122. A sidewall 127 extends from the ramp 126. The nozzle 122 forms a constriction within the housing 118, and the ramp 126 funnels the produced grain 104 into a reduced cross-sectional area of the housing 118 formed by the ramp 126 and the sidewall 127. As a result of the constriction, the produced grain 104 is compacted, removing air from the produced grain 104, and accelerating the produced grain 104 past a sensor 128. Thus, because the conveyor 106 in which the nozzle 122 resides controls the flow rate of the produced grain 104 within the conveyor 106, e.g., by rotational speed of the flighting 108, the flow velocity of the produced grain 104 increases along the constricted cross-sectional area within the conveyor 106 formed by the nozzle 122 as compared to other areas of the second conveyor 106 away from the nozzle 122. As a result, the nozzle 122 works to increase the density of the flow of the produced grain 104 as the produced grain 104 passes in front of the sensor 128. In this way, the produced grain 104 behaves in a manner similar to a fluid and accelerates through a restriction.

In some implementations, the sensor 128 may be an imaging system. For example, the sensor 128 may be an infrared sensor that uses infrared radiation to sense characteristics of the produced grain 104. Entrained air in the produced grain 104 may produce erroneous measurements. Therefore, the compaction provided by the nozzle 122 reduces air entrained with the grain providing for accurate and continuous sensing of the produced grain 104. In some implementations, the sensor 128 is the HarvestLab™ 3000 produced by Deere & Co., One John Deere Place, Moline, Ill. 61265. In other implementations, the sensor 128 may be other sensors that detect properties of the grain in other ways, such as by using radiation that is outside of the infrared or near-infrared range.

Figure 2:
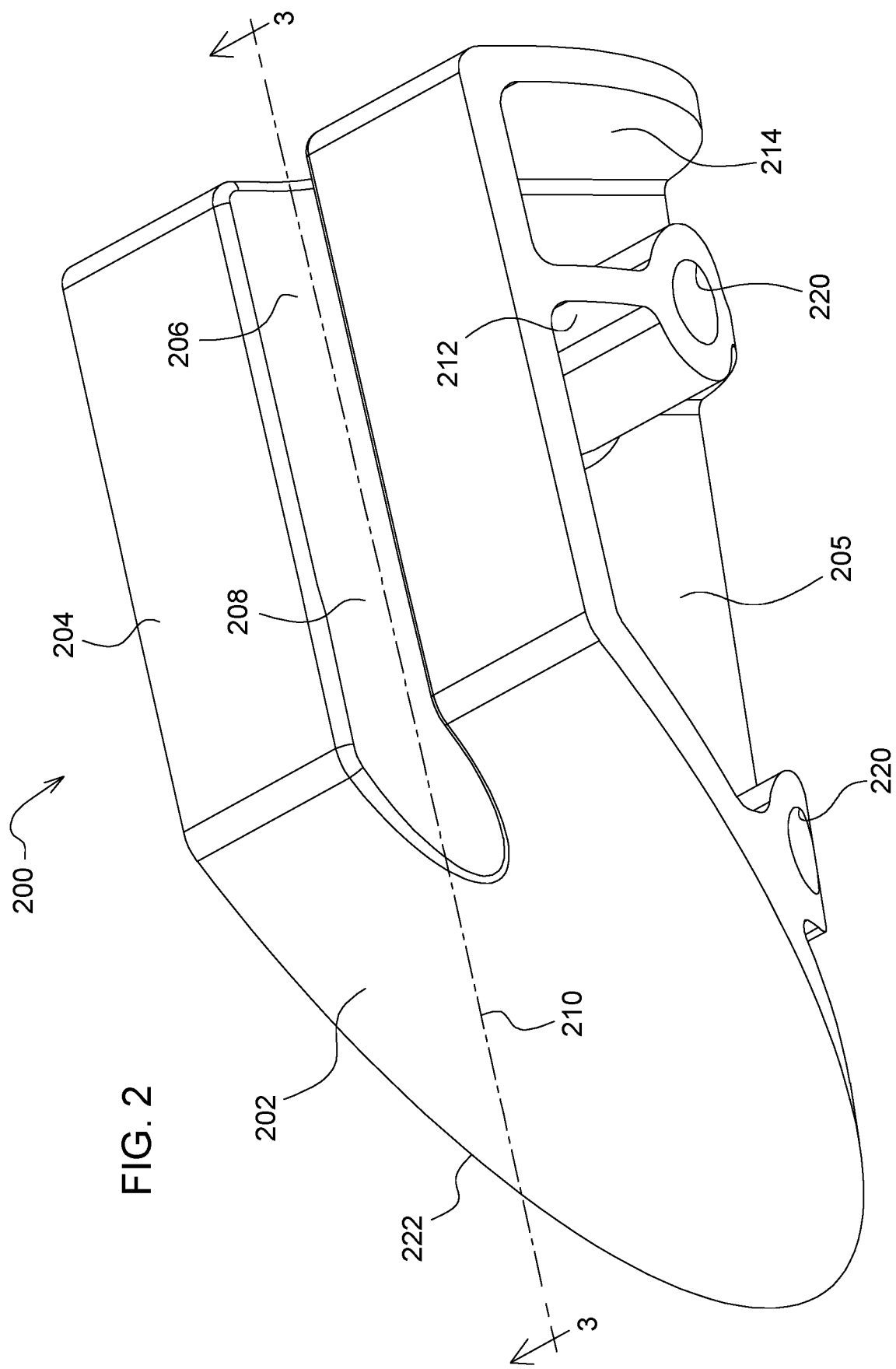
FIG. 2 is a perspective view of an example nozzle, according to some implementations of the present disclosure.

FIG. 2 is a perspective view of an example nozzle 200 similar to the nozzle 122 in FIG. 1. The nozzle 200 includes a ramp 202, a sidewall 204 extending from the ramp 202, a recess 206 extending through the ramp 202 and the sidewall 204, and a longitudinal rib 205 that extends longitudinally along the nozzle 122. The recess 206 receives the shaft of a flighting of an auger conveyor, such as the shaft 116 of the flighting 108. The recess 206 defines by an interior surface 208 and a central axis 210. The central axis 210 aligns with a longitudinal axis of a conveyor in which the nozzle 200 resides, such as the longitudinal axis 119 of the second conveyor 106. In some implementations, the sidewall 204 extends parallel to the central axis 210. In other implementations, the sidewall 204 is angled relative to the central axis 210. In the illustrated example, the interior surface 208 is a cylindrical surface and defines a circular cross-section. In other implementations, the interior surface 208 may be a cylindrical surface that defines a cross-sectional shape that is other than circular. In other implementations, the interior surface 208 may not be non-cylindrical. For example, in some instances, the interior surface 208 may be conical. In some implementations, the shaft of an auger flighting may contact the interior surface 208. Thus, the interior surface 208 may act as a bearing surface for the shaft of a flighting. In other implementations, a shaft of an auger flighting may not contact the interior surface 208.

Figure 3:
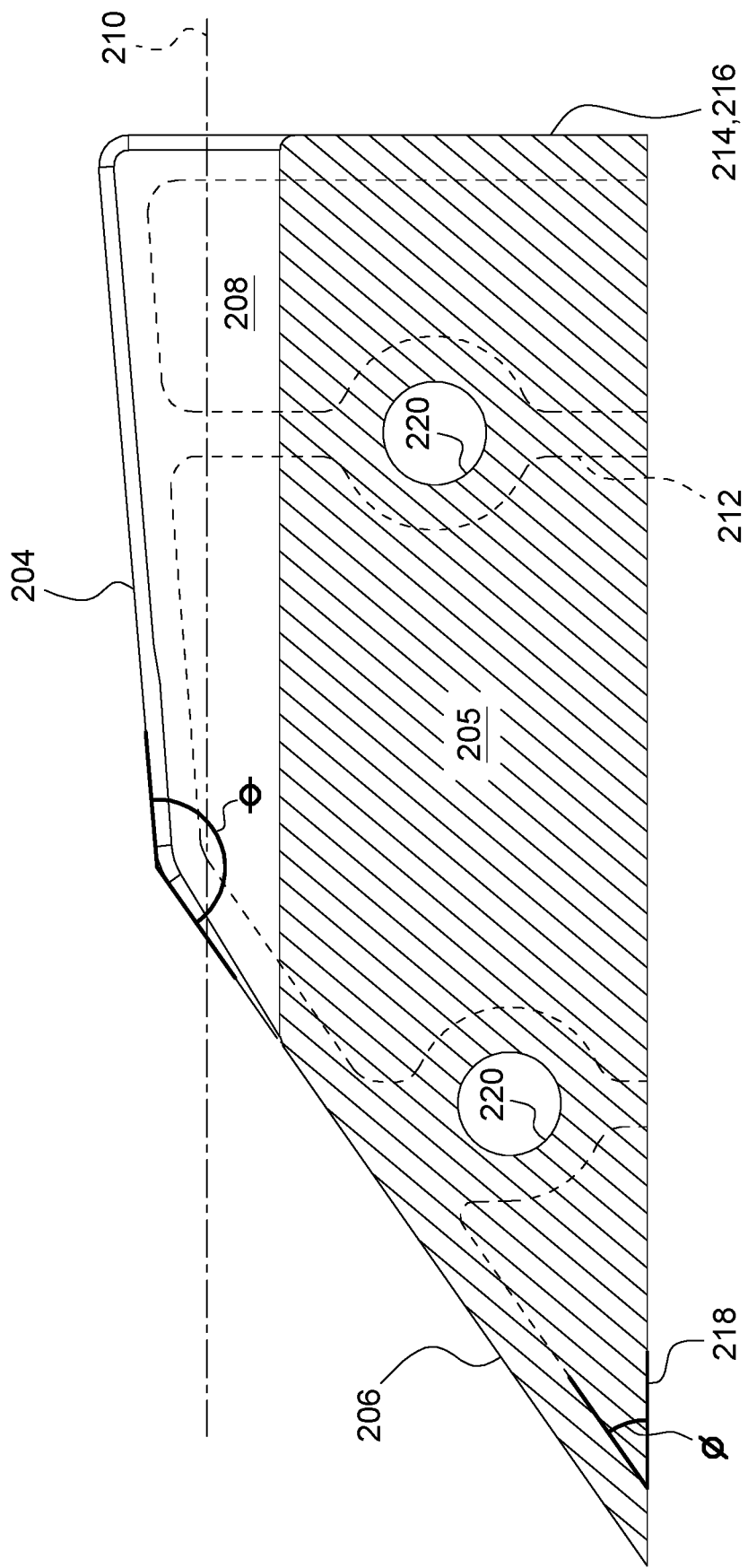
FIG. 3 a longitudinal cross-sectional view of the nozzle of FIG. 2.

FIG. 3 is a longitudinal cross-sectional view of the nozzle 200 taken along a plane that contains the central axis 210 and that symmetrically divides the nozzle 200. As shown, the nozzle 200 also includes transverse ribs 212 and 214. The transverse ribs 212 and 214 are perpendicular to the central axis 210, and the transverse ribs 212 and 214 intersect the longitudinal rib 205. The transverse ribs 212 and 214 have a circular transverse cross-sectional shape that conforms to an inner surface of the housing of a conveyor, such as the housing 118 of the second conveyor 106. The transverse rib 214 is formed at an end 216 of the nozzle 200, opposite the ramp 206. In other implementations, such as in the case where the conveyor has a non-circular cross-sectional shape, the shape of the transverse ribs 212 and 214 may be formed to have a shape corresponding to the non-circular cross-sectional shape of such conveyors.

An angle $\theta$ is formed between the ramp 206 and the sidewall 204. In the illustrated example, the angle $\theta$ is an obtuse angle. An angle $\varphi$ is defined between the ramp 206 and a line 218 that is parallel to the central axis 210. For implementations in which the sidewall 204 extends parallel to the central axis 210, the angles $\theta$ and $\varphi$ are supplementary angles, adding to 180°. In some implementations, the angle $\theta$ may be within a range of 135° and 165°. The angle $\varphi$ may be within a range of 15° and 45°. In other implementations, the supplementary angles $\theta$ and $\varphi$ may be greater than or less than the respective indicated ranges.

In the illustrated example, the nozzle 200 also includes bores 220 that are configured to receive pins to secure the nozzle 200 within a conveyor. In the illustrated example, one of the bores 220 extends along and through the transverse rib 212 and the longitudinal rib 205. Another of the bores 220 is formed along an interior surface of the ramp 206 and extends through the longitudinal rib 205. In other implementations, the bores may be provided at other locations along the nozzle 200. The pins may extend through corresponding openings in a housing of the conveyor to fix, both in translation and rotation, the nozzle 200 within the conveyor housing. As explained earlier, a nozzle within the scope of the present disclosure may be secured within a conveyor housing in other ways.

Referring again to FIG. 2, the ramp 206 defines a curved edge 222. The curved edge 222 conforms to an inner surface of a conveyor housing, such as an inner surface of the housing 118 of the second conveyor 106 described earlier. In the illustrate example, the nozzle 200 is formed to be received into a conveyor housing having a circular cross-section. As such, the curved edge 222 is elliptical in shape. The elliptical shape is defined by the intersection of a plane tilted at the angle φ relative to the central axis 210 and a cylinder corresponding to an inner surface of a conveyor housing into which the nozzle 200 is to be received. As a result, both the ramp 206 and the transverse ribs 212 and 214 conform to an inner housing of a conveyor, such as an auger conveyor similar to the second conveyor 106 described earlier. As a result, the nozzle 206 (and other nozzles within the scope of the present disclosure) reduces a cross-sectional size of a cavity of a conveyor with the ramp 206 providing for a transition between the reduced cross-sectional size and the unrestricted cross-sectional size of the conveyor. Further, the nozzle 206 conforms to an interior surface of the conveyor. Particularly, the elliptical shape of the curved edge 222 of the ramp 206 and the edges of the transverse ribs 212 and 214 conform to the interior surface of a conveyor housing.

In the example shown in FIG. 2, the ramp 206 is planar. However, in other implementations, the ramp 206 may define a curve. For example, in some implementations, a longitudinal cross-section of the ramp 206 may define a non-linear curve, such as an S-curve or another non-linear curve. In some implementations, the ramp 206 may include two or more ramp portions with each ramp portion defining a different angle φ relative to line 218. Thus, in some implementations, the nozzle 200 may include multiple ramp portions to transition the produced grain from the full cross-sectional size of a conveyor to a reduced cross-sectional size defined by the nozzle 200.

Further, in some implementations, the sidewall 204 is planar and extends parallel to the central axis 210. In some implementations, all or a portion of the sidewall 204 may be curved. For example, in some implementations, the sidewall 204 may define a longitudinally extending cylindrical shape having a curved transverse cross-sectional shape.

Figure 4:
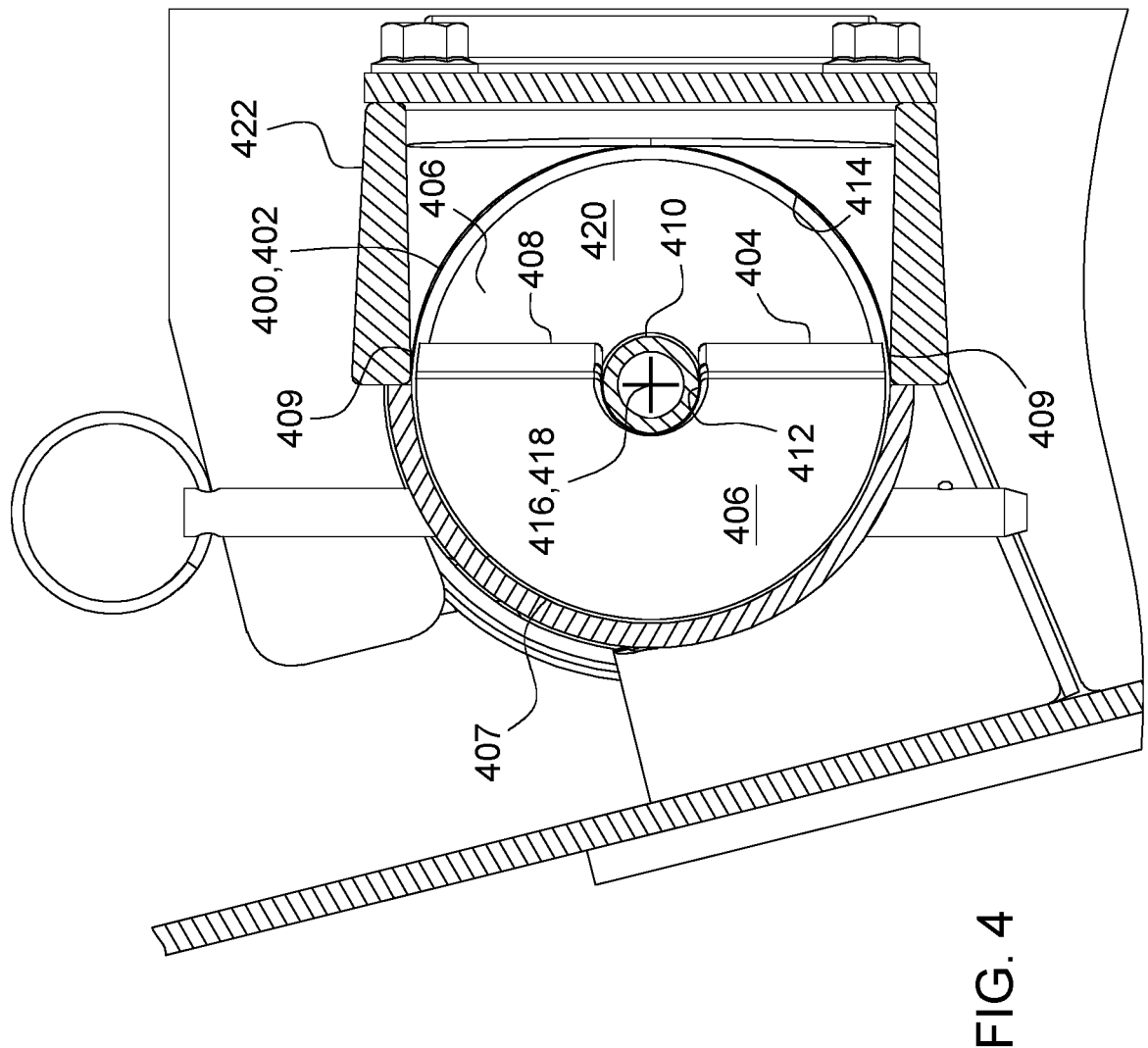
FIG. 4, a transverse cross-sectional view of a housing of a conveyor containing an example nozzle, according to some implementations of the present disclosure.

FIG. 4 is a transverse cross-sectional view of a housing 400 of a conveyor 402. The conveyor 402 may be an auger conveyor similar to the second conveyor 106, described earlier. An example nozzle 404 is disposed within a cavity 406 of the housing 400 of the conveyor 402. The nozzle 404 includes a ramp 406 and a sidewall 408 that extends along a portion of a length of the conveyor 402. A shaft 410 of the conveyor 402 is received in a recess 412 formed in the nozzle 404. The shaft 410 may be the shaft of an auger flighting, which may be similar to the flighting 108, described earlier. As shown, the nozzle 404 conforms to an interior surface 414 of the housing 400 of the conveyor 402. A longitudinal axis 416 of the conveyor 402 extends longitudinally along a length of the conveyor 402, and a central axis 418 of the nozzle 404 aligns with the longitudinal axis 416. In the illustrated example, the longitudinal axis 416 corresponds to a longitudinal axis of the shaft 410. The ramp 406 includes a curved edge 407 that conforms to the interior surface 414 of the housing 400, and the sidewall 408 incudes side edges 409 that extend longitudinally along the conveyor 402 and that conform to interior surface 414 of the housing 400.

As shown, the nozzle 404 forms a restriction that reduces a cross-sectional size of the cavity 406 to a reduced portion 420. A size of the reduced portion 420 may be selected to compact the produced grain to a level that provides accurate sensor measurements by a sensor 422, which may be similar to the sensors described earlier. In some implementations, the amount of cross-sectional reduction provided by the nozzle 400 may be within a range of up to 55%. In some implementations, the amount of reduction may be greater than 55%. An amount of cross-sectional area reduction provided by the nozzle may be selected based on, for example, crop type, grain size, or harvesting speed. The amount of constriction may be selected in order to increase a density of the produced grain in order to provide a continuous flow of produced grain as the flow of grain passes the sensor 412. The continuous flow avoids voids or air gaps within the grain that leads to erroneous sensor measurements.

Nozzles within the scope of the present disclosure may be formed from, for example, metal, plastic, composite materials, or a combination of different materials.

A user may swap out one nozzle that produces a first amount of restriction within a conveyor to another nozzle that produces a second amount of restriction within the conveyor, different from the first amount of reduction, in order to respond to changing harvesting condition. Changing harvesting conditions may include crop type, grain size, or harvesting speed. As such, the nozzles are selectively removable from the conveyor, for example, to respond to the changing harvesting conditions.

Without in any way limiting the scope, interpretation, or application of the claims appearing below, a technical effect of one or more of the example implementations disclosed herein is to provide nozzles that are interchangeable in response to changing harvesting conditions in order to provide a continuous flow of grain flowing past a sensor in order to provide accurate sensor measurements of the grain.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A nozzle received into an interior cavity of a conveyor to alter a cross-sectional size of the interior cavity of the conveyor, the nozzle comprising:
    a ramp comprising a first edge configured to conform to an interior surface of a conveyor;
    a sidewall coupled to the ramp, the sidewall comprising side edges configured to conform to the interior surface of the conveyor;
    an angle θ defined between the ramp and the sidewall; and
    a recess formed in the sidewall and extending longitudinally therein, the recess configured to receive a shaft of the conveyor.

2. The nozzle of claim 1, wherein first edge is elliptical.

3. The nozzle of claim 1, wherein the angle θ defined between the ramp and the sidewall is an obtuse angle.

4. The nozzle of claim 1, wherein the recess defines a central axis extending therealong and wherein the first edge comprises a shape defined by an intersection of a plane tilted at an angle formed between the ramp and the central axis and a cylinder whose centerline is aligned with the central axis.

5. The nozzle of claim 4, wherein the cylinder comprises a circular cross-sectional shape.

6. The nozzle of claim 1, wherein the recess comprises a circular cross-sectional shape.

7. The nozzle of claim 1, further comprising a transversely extending bore.

8. The nozzle of claim 1, further comprising at least one transversely extending rib formed along the sidewall.

9. The nozzle of claim 1, wherein the angle θ is within a range of 135° and 165°.

10. A conveyor for transport of grain, the conveyor comprising:
- a housing defining a cavity with a cross-sectional size, the housing comprising:
  - an inner surface; and
  - a longitudinal axis extending along the cavity;
- a flighting disposed in the cavity and rotatable therein, the flighting comprising:
  - a shaft;
  - a first portion attached to the shaft; and
  - a second portion attached to the shaft, the second portion separated from the first portion by a gap; and
- a nozzle disposed in the cavity and affixed to the housing, the nozzle extending at least partially along the gap, the nozzle comprising:
  - a ramp;
  - a sidewall extending along the cavity; and
  - an angle θ defined between the ramp and the sidewall, the nozzle creating a restriction that reduces the cross-sectional size of the cavity,
wherein the ramp defines an edge that conforms to the inner surface of the housing.

11. The conveyor of claim 10, wherein the nozzle further comprising a recess extending along the sidewall, the recess receiving the shaft of the flighting.

12. The conveyor of claim 11, wherein the nozzle comprises an interior surface that defines the recess and wherein the shaft contacts an interior surface.

13. The conveyor of claim 10, wherein the edge comprises a shape defined by an intersection of a plane tilted at an angle formed between the ramp and the longitudinal axis and the inner surface of the housing.

14. The conveyor of claim 10, wherein the nozzle defines a bore that accepts a pin to secure the nozzle to the housing.

15. The conveyor of claim 10, wherein the sidewall defines edges that conform to the interior surface of the housing.

16. The conveyor of claim 10, wherein the nozzle further comprises at least one transversely extending rib.

17. The conveyor of claim 16, wherein the at least one transversely extending rib extends from the sidewall.

18. The conveyor of claim 10, wherein the angle θ is within a range of 135° and 165°.

19. The conveyor of claim 10, wherein the reduction in cross-sectional size of the cavity caused by the nozzle is up to 55%.

\* \* \* \* \*